United States Patent [19]

Shimaoka et al.

[11] Patent Number: 4,583,140
[45] Date of Patent: Apr. 15, 1986

[54] DISK CARTRIDGE LOADING APPARATUS FOR USE IN RECORDING/REPRODUCING DEVICE

[75] Inventors: Motohiro Shimaoka; Yukio Saito, both of Furukawa, Japan

[73] Assignee: Alps Electric Co., Ltd., Japan

[21] Appl. No.: 564,074

[22] Filed: Dec. 21, 1983

[30] Foreign Application Priority Data

Dec. 21, 1982 [JP] Japan .............................. 57-192128[U]

[51] Int. Cl.$^4$ ............................................. G11B 5/012
[52] U.S. Cl. ........................................ 360/97; 242/198
[58] Field of Search ................. 360/90, 93, 96.1, 96.5, 360/97

[56] References Cited

U.S. PATENT DOCUMENTS 3,904,149  8/1974  Suzuki .................................... 360/96
4,257,075  3/1981  Wysocki et al. ...................... 360/96.5

Primary Examiner—John H. Wolff
Attorney, Agent, or Firm—Guy W. Shoup

[57] ABSTRACT

A recording/reproducing device comprising a cartridge holder adapted to be moved from an unloaded state to a loaded state by a vertical movement of a roller provided on each side portion of the cartridge holder, and a cam member having a flat portion adapted to contact and guide the roller and an inclined push-up portion adapted to abut the roller to return the cartridge holder from the loaded state to the unloaded state. The cam member is formed with a projecting portion at its portion changing from the flat portion to the inclined push-up portion. It is possible to give the "click" touch to the user at the time of transfer from unloaded to loaded state in the disc cartridge inserting operation.

5 Claims, 4 Drawing Figures

DISK CARTRIDGE LOADING APPARATUS FOR USE IN RECORDING/REPRODUCING DEVICE

BACKGROUND OF THE INVENTION (1) Field of the Invention

The present invention relates to a recording/reproducing device using a disc cartridge.

(2) Description of the Prior Art

Recently, there has been developed a recording/reproducing device including a cartridge holder adapted to assume a loaded state for recording and playback upon insertion therein of a disc cartridge in which is rotatably enclosed a magnetic disc, the cartridge being formed of a hard material. However, this recording/reproducing device is not provided with a mechanism for giving to the user the sense of touch indicating transfer from unloaded to loaded state when the cartridge holder is moved by the insertion therein of the disc cartridge. Therefore, the user feels uneasy about when the cartridge holder assumes the loaded state at the time of insertion therein of the disc cartridge.

SUMMARY OF THE INVENTION

It is the object of the present invention to provide a recording/reproducing device capable of eliminating the above-mentioned drawbacks of the prior art and giving to the user the so-called "click" touch upon transfer to the loaded state when the disc cartridge is inserted into the cartridge holder.

The recording/reproducing device of the present invention is characterized by comprising a cartridge holder adapted to be moved from an unloaded state to a loaded state by a vertical movement of a roller provided on each side portion of the cartridge holder, and a cam member having a flat portion adapted to contact and guide the roller and an inclined push-up portion adapted to abut the roller to return the cartridge holder from the loaded state to the unloaded state, the cam member being formed with a projecting portion at its portion changing from the flat portion to the inclined push-up portion so that the roller can get thereover.

DESCRIPTION OF A PREFERRED EMBODIMENT

Figure 1:
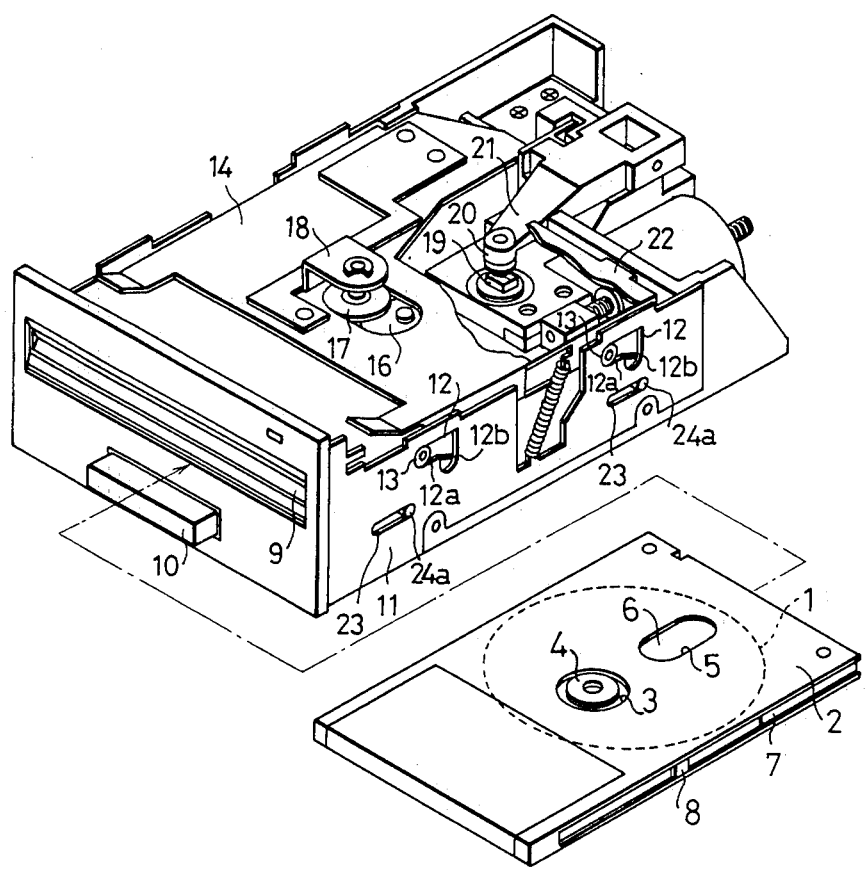
FIG. 1 is a schematic perspective view of a recording/reproducing device according to an embodiment of the present invention.

An embodiment of the present invention will be described hereinunder with reference to the drawings.

A magnetic disc 1 is rotatably enclosed in a disc cartridge 2 formed of a hard synthetic resin, and a hub 4 which centrally holds the magnetic disc 1 is exposed to a through hole 3 formed centrally in the disc cartridge 2. In a predetermined position of the cartridge 2 is formed a magnetic head insertion aperture 5, and below the aperture 5 is pivotably disposed a shutter 6 which comprises a metallic plate. On both sides of the disc cartridge 2 are formed grooves 7, in one of which is slidably disposed a shutter operating portion 8 for operating the shutter 6.

Figure 2:
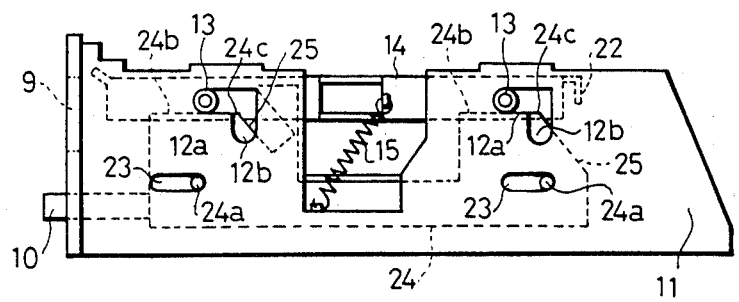
FIG. 2 is a side view showing principal components of the recording/reproducing device in an unloaded state.
Figure 3:
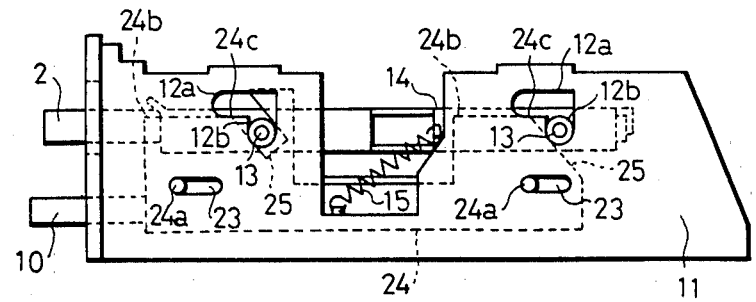
FIG. 3 is a side view showing principal components of the recording/reproducing device in a loaded state.
Figure 4:
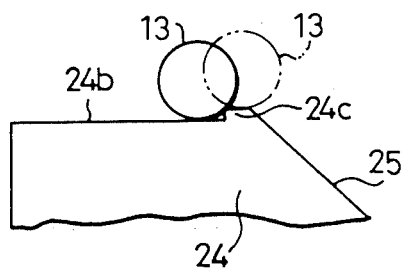
FIG. 4 is a partial side view of a principal portion of the recording/reproducing device in transition from the unloaded state to the loaded state.

On the other hand, in the front frame of the recording/reproducing device are provided a insertion opening 9 for the cartridge 2 and an inject button 10. Behind the insertion opening 9 is disposed a cartridge holder 14 which is provided at both side portions with rollers 13 adapted to be guided by -shaped holes formed in both side portions of a frame 11. The cartridge holder 14 is urged downwardly toward the front frame at all times by means of a tension spring 15 attached to the frame 11. While the cartridge 2 is not inserted in the cartridge holder 14, the roller 13 is held in the fore end position of a horizontal portion 12a of the -shaped hole 12 by the tension spring 15, as shown in FIG. 2. On the front upper portion of the cartridge holder 14, as shown in FIG. 1, there is provided a receiving portion 18 for a pressing portion 17 which presses the hub 4 of the magnetic disc 1 against a turntable 16. Further, on the rear upper surface of the cartridge holder 14 is provided an abutting portion for pushing up an arm 21 with a pad 20 attached thereto when the roller 13 of the cartridge holder 14 is located on the horizontal portion 12a of the -shaped hole, in opposed relation to the magnetic head 19. Additionally, the cartridge holder 14 is formed at the rear end thereof with a bent portion 22 adapted to abut the fore end of the cartridge 2.

To the inject button 10 is connected a push-up cam member 24 provided at the side portions thereof with pins 24a which are guided by lateral apertures 23 formed in the side portions of the frame 11. The cam member 24 is formed with an inclined push-up portion 25 capable of abutting the roller 13 in a vertical portion 12b of the -shaped hole 12, and is also formed with a flat portion 24b adapted to contact the roller 13 and the serve as a guide for the movement of the roller 13 in conjunction with the horizontal portion 12a of the -shaped hole 12, and is further formed with a projecting portion 24c at its portion changing from the flat portion 24b to the inclined push-up portion 25, the projecting portion 24c projecting to the extent that the roller 13 can get thereover.

Therefore, when the cartridge 2 is inserted in the cartridge holder 14 and the fore end of the cartridge 2 pushes the bent portion 22 of the cartridge holder 14, the cartridge holder 14 moves to the right in the drawings and the roller 13 moves on the horizontal portion 12a of the -shaped hole 12 and the flat portion 24b of the cam member 24. When the roller 13 reaches the projecting portion 24c, resistance is once applied to the roller 13, but if the cartridge 2 is further inserted in the cartrige holder, the roller 13 gets over the projecting portion 24c, moves toward the inclined portion 25 and reaches the vertical portion 12b of the -shaped hole 12, so that the roller 13 moves rapidly to the lower part of the vertical portion 12b while urging the inclined push-up portion 25 to the left by virtue of the biasing force of the tension spring 15, whereby the cartridge holder 14 is urged downward and assumes the loaded state. Consequently, the hub 4 of the magnetic disc 1 is urged to the turntable 16 by the pressing portion 17 which is attached to the cartridge holder 14, so the magnetic disc 1 is ready to rotate. On the other hand, since the magnetic head inserted aperture 5 of the cartridge 2 is in an opened state resulting from operation of the shutter 6 with an opening/closing pin (not shown)

which is provided near the insertion opening 9, the pad 20 attached to the fore end of the arm 21 goes down as the cartridge holder 14 is forced down, whereby the magnetic disc 1 is urged against the magnetic head 19, ready for recording and playback. In the above operation, the resistance induced when the roller 13 gets over the projecting portion 24c of cam member 24 gives the so-called "click" touch to the user who is doing the cartridge inserting operation, that is, the user can feel the transfer from unloaded to loaded state.

For returning the cartridge holder 14 from the loaded state to the unloaded state, the inject button 10 is pushed inwards, whereupon the inclined push-up portion 25 of the cam member 24 pushes up the lower portion of the roller 13 which is positioned in the lower part of the vertical portion 12b of the -shaped hole 12, so that the roller 13 goes up onto the projecting portion 24c while being held between the inclined portion 25 and the vertical portion 12b of the -shaped hole 12. When the roller 13 reaches the horizontal portion 12a, the inclined portion 25 no longer abuts the roller 13, so the roller 13 gets over the projecting portion 24c of the cam member 24 and moves to the fore end portion of the horizontal portion 12a by virtue of the bias of the tension spring 15 of the cartridge holder 14. With this movement of the roller 13, the cartridge holder 14 moves upward and toward the insertion opening 9 until it assumes the state before loading.

According to the recording/reproducing device of the present invention having the above-described construction, with a simple construction of the roller and the projecting portion of the cam member, it is possible to give the "click" touch to the user at the time of transfer to the loaded state in the disc cartridge inserting operation.

What is claimed is:

1. A recording and reproducing apparatus comprising:
    a cartridge holder adapted to accomodate a disk cartridge inserted therein, said cartridge holder having a roller affixed on a side portion of said holder and being movable in said apparatus between unloaded and loaded positions by movement of the roller in a backward horizontal and a downward vertical direction;
    a resilient member for normally biasing said cartridge holder toward the unloaded position toward a front side of said apparatus, said cartridge holder being movable in the backward direction toward a back side of said apparatus against the biasing force of said resilient member and in the downward vertical direction to the loaded position; and
    a movable cam member having a horizontal portion for contacting and guiding said roller on the horizontal backward movement and an inclined portion adapted to abut said roller on the downward vertical movement of said cartridge holder to the loaded position and to return said cartridge holder to the unloaded position upon an ejection movement of said cam member wherein said inclined portion pushes said roller and cartridge holder upward vertically, said cam member being formed with a projecting portion smaller than the diameter of said roller and located adjacent to an intersection of the horizontal and inclined portions of said cam member, so that said roller makes a click contact and moves over said projecting portion during its backward horizontal and downward vertical movement to the loaded position.

2. A recording/reproducing device according to claim 1, wherein said roller is adapted to be moved by the action of said cam member along a inverted L-shaped hole formed in a side portion of the apparatus, thereby premitting said cartridge holder to take two positions, one being an unloaded state position and the other being a loaded state position.

3. A recording/reproducing device according to claim 2, wherein said cartridge holder is urged toward the front side direction.

4. A recording/reproducing device according to claim 3, characterized by including a tension spring stretched between said cartridge holder and each side portion of the device body.

5. A recording/reproducing device according to claim 1, wherein said projecting portion is formed on said horizontal portion of said cam member in a position close to said inclined portion of said cam member.

* * * * *